United States Patent
Chen et al.

(10) Patent No.: US 12,420,406 B1
(45) Date of Patent: Sep. 23, 2025

(54) PNEUMATIC SYSTEM MODELING

(71) Applicant: Amazon Technologies, Inc., Seattle, WA (US)

(72) Inventors: Tianjian Chen, New York, NY (US); Andrew D Marchese, Concord, MA (US)

(73) Assignee: Amazon Technologies, Inc., Seattle, WA (US)

( * ) Notice: Subject to any disclaimer, the term of this patent is extended or adjusted under 35 U.S.C. 154(b) by 635 days.

(21) Appl. No.: 17/708,898

(22) Filed: Mar. 30, 2022

(51) Int. Cl.
*B25J 9/16* (2006.01)
*B25J 15/06* (2006.01)
*B65G 47/91* (2006.01)

(52) U.S. Cl.
CPC ........... *B25J 9/1605* (2013.01); *B25J 9/1607* (2013.01); *B25J 9/1653* (2013.01); *B25J 15/0616* (2013.01); *B65G 47/917* (2013.01)

(58) Field of Classification Search
CPC ...... B25J 9/1605; B25J 9/1607; B25J 9/1653; B25J 15/0616; B65G 47/917
USPC ........................................................ 700/146
See application file for complete search history.

(56) References Cited

U.S. PATENT DOCUMENTS

| | | | | |
|---|---|---|---|---|
| 9,205,558 | B1* | 12/2015 | Zevenbergen | B25J 9/1664 |
| 11,401,692 | B2* | 8/2022 | Rannow | E02F 9/2207 |
| 2020/0089824 | A1* | 3/2020 | Linehan | G05B 13/04 |
| 2020/0130936 | A1* | 4/2020 | Shekhawat | B25J 9/1664 |
| 2020/0149249 | A1* | 5/2020 | Rannow | E02F 3/432 |
| 2021/0178579 | A1* | 6/2021 | Saunders | B25J 15/0052 |
| 2022/0075918 | A1* | 3/2022 | McGregor | G06F 30/28 |

FOREIGN PATENT DOCUMENTS

CN 103049615 A * 4/2013

* cited by examiner

*Primary Examiner* — Thomas C Lee
*Assistant Examiner* — Michael Tang
(74) *Attorney, Agent, or Firm* — Kilpatrick Townsend & Stockton LLP

(57) ABSTRACT

A pneumatic element graph of a pneumatic system can be accessed. The pneumatic system may include a set of pneumatic components. A set of input controls may be received. The set of input control elements may correspond to at least one of i) an operational command of at a first pneumatic component of the set of pneumatic components, or ii) a geometric feature of a second pneumatic component of the set of pneumatic components. A set of pressure states may be determined for at least one pneumatic component of the set of pneumatic components based at least in part on previous pressure states of the at least one pneumatic component. An operational sequence of the pneumatic system using the previous pressure states may be performed.

20 Claims, 9 Drawing Sheets

PNEUMATIC SYSTEM MODELING

BACKGROUND

Many modern day industries are beginning to rely more and more on robotic manipulators such as robotic arms. Such robotic manipulators may function to increase repeatability of tasks, increase efficiency of production lines, and bring other benefits to their operators. Some robotic arms and other automated systems include pneumatic systems to control certain functions, e.g., operating a suction end effector.

BRIEF DESCRIPTION OF THE DRAWINGS

Various examples in accordance with the present disclosure will be described with reference to the drawings, in which.

DETAILED DESCRIPTION

Figure 1:
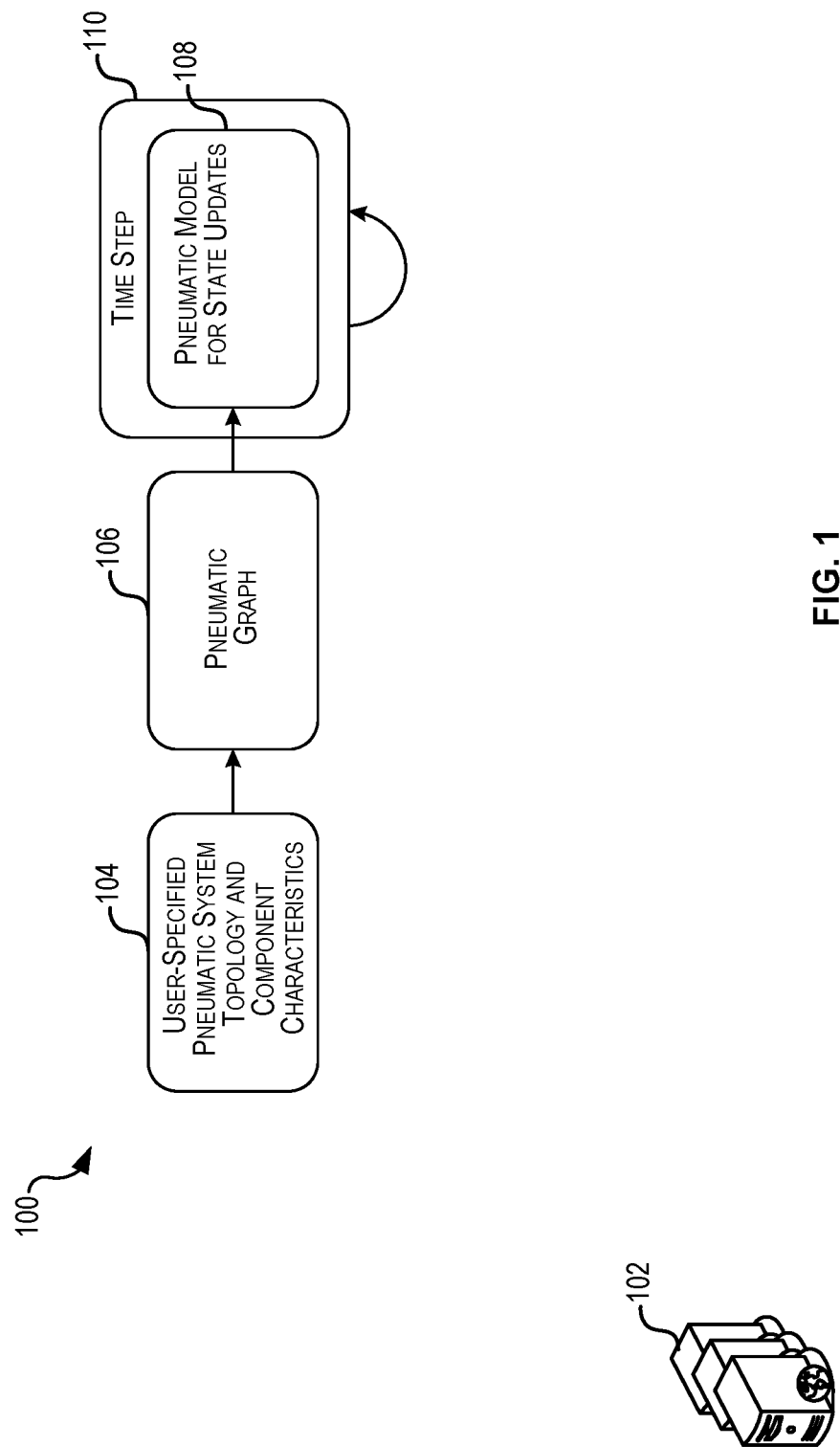
FIG. 1 illustrates a block diagram showing an example process for implementing techniques relating to pneumatic system modeling and simulation, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed to, among other things, systems, devices, computer-readable media, and methods relating to pneumatic system modeling for development and control of real-world pneumatic systems. The pneumatic modeling techniques described herein may function as a "digital twin" of real robotic system hardware, resulting in simulation of the real robotic system hardware in a nearly identical fashion. Conventional modeling of pneumatic systems, such as those that include suction end of arm tools, have multiple shortcomings. For example, these models have only binary logic for modeling suction pressures (whereas real suction pressures are continuous in nature), do not account for a correlation between the vacuum pressure and cup engagement states, and do not account for dependencies between different suction cups in the same vacuum line (whereas in practice these suction cups are interconnected by vacuum pressure and are thereby dependent on each other). The techniques described herein provide modeling techniques that account for these shortcomings, while also providing additional benefits. For example, the pneumatic modeling techniques provide realistic grasping behavior in simulation (e.g., the time responses of building up vacuum are accurately modeling and the interplay between suction cups in the same vacuum line are accounted for), provide for rapid development and testing of pneumatic-related algorithms (e.g., the pressure and flow signals can be simulated and fed into control algorithms, e.g., if a real-time pressure cannot be obtained, a model can be used to simulate the pressure, which can then be feed into a control system as a corollary for the real-time pressure reading), and provide for rapid concept prototyping for pneumatic hardware (e.g., a library of reusable modeling building blocks are provided (e.g., valves, pumps, suction cups, etc.) that allow hardware designers to quickly and easily test new configurations without having to spend time building a real-world mock up of the hardware).

The techniques herein are described with respect to pneumatic systems used in robotic manipulation systems, but these techniques are equally applicable to any pneumatic system that includes similar components (e.g., valves, pumps, suction cups, gaspers, air nozzles, and/or similar components). For example, such techniques may be equally applicable to any pneumatic system used in an automated system, vehicle control, and the like.

Turning now to a particular example, in this example, a pneumatic modeling system is provided that enables modeling of a pneumatic system implemented in a robotic manipulation system. The pneumatic modeling system first generates a pneumatic element graph that is in a form that the pneumatic modeling system can ingest for modeling purposes. To begin, a user provides connection configuration information that describes component (e.g., valves, pumps, suction cups, etc.) characteristics and their upstream and downstream connections in the system to be modeled. The pneumatic modeling system uses the connection configuration information to generate a pneumatic component graph. The pneumatic component graph includes vertices and edges that encapsulate components and connections. The pneumatic modeling system then uses the pneumatic component graph to generate the pneumatic element graph. This includes subdividing each pneumatic component into the pneumatic elements associated with it. The pneumatic elements may include the elements such as pressure, resistance, capacitance, source, and the like. When finished, the pneumatic element graph represents the pneumatic system with edges that are pneumatic elements and vertices that are air pressures of interest. Once the pneumatic element graph has been created, it is provided to the pneumatic modeling system along with a set of solenoid commands to be tested and a set of cup-object distances corresponding to suction cups of the pneumatic system (e.g., distances between suction cups and objects). The pneumatic modeling system uses this input information to iteratively determine pressure values at each of the vertices of the pneumatic element graph when the set of solenoid commands are implemented. A pressure at one of the vertices is a function of previous pressures at the vertex, such that Kirchhoff's Law (which is dependent on an incident matrix of the pneumatic element graph and a flow function that is a function of previous an updated pressures at the vertices) can be satisfied. To solve for the pressures, a non-linear or linear solver may be used. The output of the modeling may include pressure vectors for each vertex, which can be used to simulate operation of the pneumatic system.

Turning now to the figures, FIG. 1 illustrates a block diagram showing an example process 100 for implementing techniques relating to pneumatic system modeling and simulation, according to at least one example. The process 100 is represented by a high-level block diagram. The process 100 may be implemented by a computer system 102, which may be any suitable computer, server, virtual resource, user device, or the like.

Figure 2:
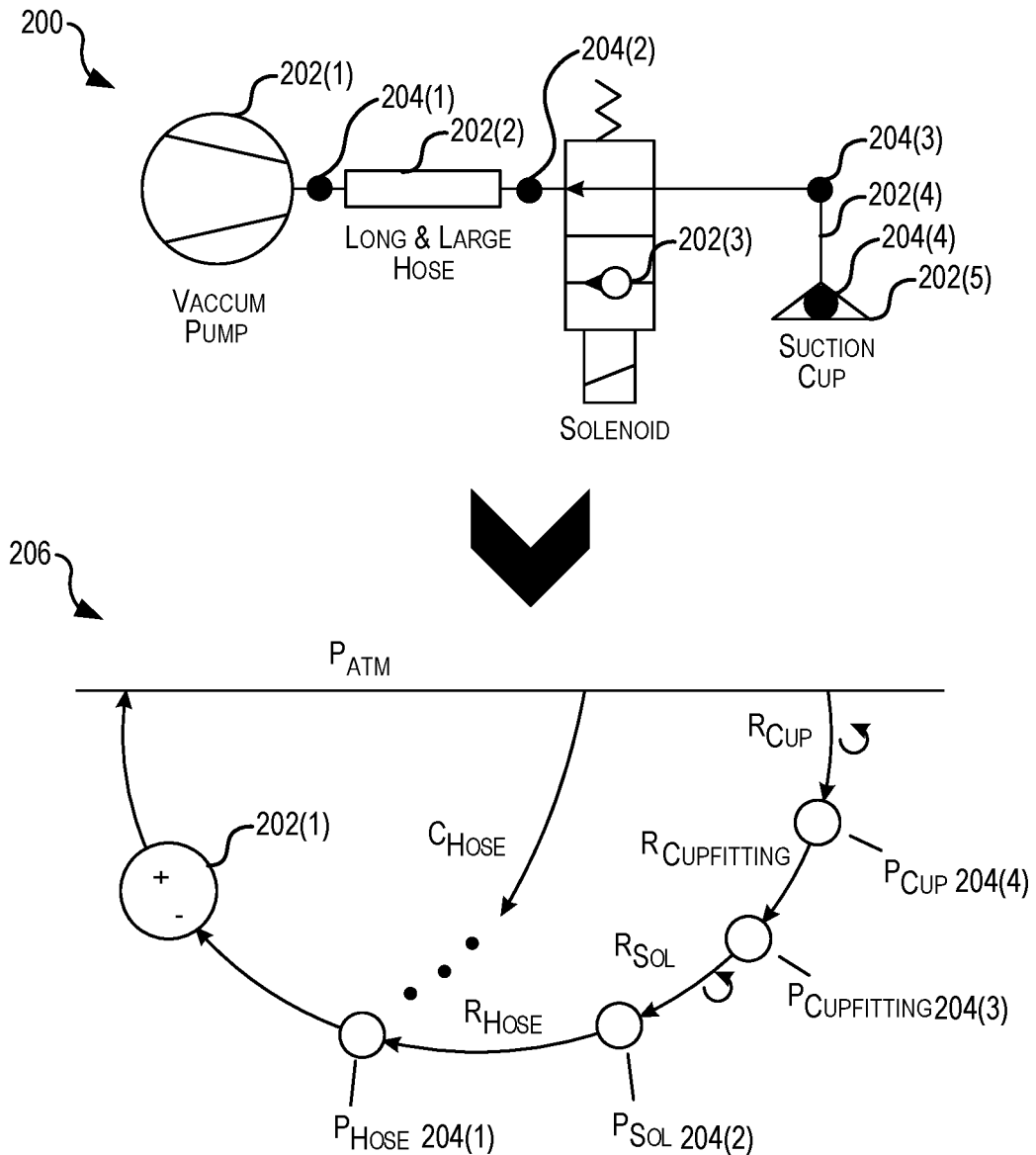
FIG. 2 illustrates an example pneumatic system and corresponding pneumatic element graph for implementing techniques relating to pneumatic system modeling and simulation, according to at least one example.

The process 100 begins at block 104 by the computer system 102 accessing information about user-specified pneumatic system topology and component characteristics corresponding to a pneumatic system such as pneumatic system 200 illustrated in FIG. 2. An example pneumatic system may include various components that are the parts that make up the system (e.g., pumps, compressors, air reservoirs, solenoids, long hoses, short hoses, narrow hoses, thick hoses, accumulation tanks, valves, filters, unions, manifolds, vacuum actuated pistons, suction cups, and other similar components) and the system topology may identify how the components are connected together. The pneumatic system 200, which is presented as a pneumatic component graph, in particular, is a single suction cup system that includes pneumatic components 202 such as a vacuum pump 202(1), a long and large hose 202(2), a solenoid 202(3), a suction cup fitting 202(4), and a suction cup 202(5). The pneumatic system 200 also includes various pressure locations 204 at which pressures in the system may be modeled. For example, pressure locations 204 may include a hose pressure 204(1), a solenoid pressure 204(2), a suction cup fitting pressure 204(3), and a suction cup pressure 204(4). In some examples, a user may generate a file that includes the topology and characteristics of the components by using the computer system 102 or by using a different computer system and sharing the file with the computer system 102. For example, the user may generate a file in a digestible data serialization language for creating configuration files (e.g., a YAML file).

In some examples, the computer system 102 may provide a mechanism for the user to generate the file by building the pneumatic system. This may include providing information about the components and how the components are interconnected. An example of how a simple pneumatic system may be represented in YAML-format is provided below:

```
#+ - - - +0+ - - - +1+ - - - +
#|pump|- - - |valve|- - - |cup|
#+ - - - ++ - - - ++ - - - +
pneum_sys:
  components:
    pump:
      type: -1 #vacuum src
      k: -3.2e-07 #in (kg/s)/Pa, pump slope
      Q0: 0.03 #in kg/s, pump max flow
      Delta_p_extreme: 95000 #in Pa, pump max vacuum
      downstream_connections: [0]
    valve:
      D: 9.5e-08 #in m^3/(s*Pa), open valve sonic conductance
      b: 6.4e-01 #unitless, open valve critical pressure ratio
      upstream_connections: [0]
      downstream_connections: [1]
    suction_cup:
      d_cup: 0.05 #in m, cup diameter
      d_fitting: 0.008 #in m, cup fitting diameter
      d_act_max: 0.005 #in m, max cup action distance
      upstream_connections: [1]
  sensors:
    pressure_sensor_connections: [0, 1]
    flow_sensor_connections: [0]
  valve_mech_dynamics:
    tau: 0.04 #in s, time constant of the mechanical dynamics of the valve.
```

At block 106, the process 100 includes the computer system 102 generating a pneumatic graph that represents the pneumatic system topology and component characteristics. For example, the computer system 102 may use the file (e.g., a YAML file or other comparable file) to generate the pneumatic graph. As described herein, the pneumatic graph may include at least two types of graphs that each represent the pneumatic system topology and component characteristics, but do so in a different manner. For example, a pneumatic component graph may first be generated that includes vertices corresponding to components and edges corresponding to connections. As part of using the pneumatic component graph to generate a pneumatic element graph (e.g., 206), pneumatic components in the pneumatic component graph may be subdivided into pneumatic elements (e.g., pressure, capacitance, resistance, etc.) associated with each component and the connections may be regenerated. For example, a solenoid (a type of component) may include a resistance element (e.g., air that flows through the solenoid is constrained and/or slowed down) and a pressure element (e.g., a pressure that is of interest as it is indicative of operation of the solenoid). Other components may similarly be divided into their respective pneumatic element(s). This information may then be used to generate a pneumatic element graph, with vertices corresponding to air pressures of interest and edges corresponding pneumatic elements.

Each pneumatic component 202 may be represented by its own pneumatic element and component models. These models capture characteristics of the pneumatic component 202 in ways that are indicative of the pneumatic elements. For example, the pneumatic components 202 and the system may be represented a fluid circuits. A source component such as a pump may have a model that depends on the pressure flow characteristics provided by the manufacture, and may be represented as actual cubic feet per minute (ACFM) (volume of flow under local pressure) or standard CFM (SCFM), which may depend on mass flow of the fluid. In some examples, the model may be a linear graph. Fluid resistance may be modeled using any suitable model such as Sanville's restricted flow model. Fluid capacitance can be modeled as two types: first type is a change in container volume (e.g., due to piston) and second type is a pressurization of containers (e.g., tanks), where total capacitance may be a summation of these two types. A shop air source may be modeled as an ideal constant-pressure source. A hose can be modeled as combinations of fluid resistances (since friction impedes air) and capacitances (since they include internal volumes). Solenoids can be modeled as pure fluid resistances, parameterized by the Sonic Conductance C and Critical Pressure Ratio b. A rotary union may be modeled as a pure fluid resistance. A vacuum actuated piston (VAP) may be modeled as a combination of a fluid resistance and capacitance. Suction cups can be modeled as combinations of variable resistance and capacitance. The resistance is a function of cub-object distances (or cup edge witness points to object distances), object local geometry (flat, edge, or corner), and object material. A machine learning model may be used to compute the resistance values of the components, described herein.

As shown in FIG. 2, a pneumatic element graph 206 has been generated to represent the pneumatic system 200. In particular, the pneumatic element graph 206 includes vertices to represent the air pressures of interest 204 and edges to represent corresponding pneumatic elements associated with the pneumatic components 202. For example, the hose 202(2) is represented by a capacitance ($C_{HOSE}$) and a resistance ($R_{HOSE}$). This is because the hose 202(2) is long and large so it stores some quantity of air like a capacitor but also includes a resistance. The solenoid 202(3), pressure cup fitting 202(4), and suction cup 202(5) are represented, respectively by resistance values $R_{SOL}$, $R_{CUPFITTING}$, and $R_{CUP}$. The suction cup 202(5) and the vacuum pump 202(2) both are connected to an open pressure. The pneumatic element graph 206 may represent a form that can be ingested by the algorithm described herein to generate the pneumatic model.

Returning to the process 100 of FIG. 1, at block 108, the process 100 includes the computer system 102 generating a pneumatic model for state updates (e.g., pressure states). The pneumatic model may be referred to as a state-space model such as $x[n]=f(x[n-1], u[n-1])$ for the pneumatic system (e.g., the pneumatic system 200). In this example, the state x is the pressure vector, input u is the vector of solenoid commands and cup distances. Once the model has been generated, existing approaches such as a time-step function 110 may be used to iteratively evaluates the states in a manner described herein. In some examples, solving for the state-space model may include using one of the solvers described in FIG. 3.

Figure 3:
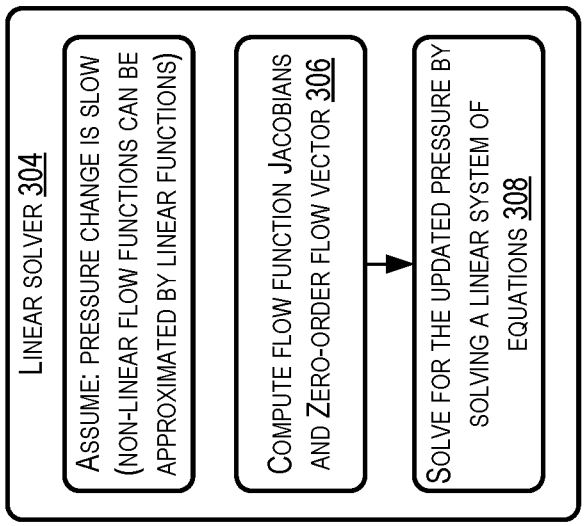
FIG. 3 illustrates a block diagram showing an example non-linear solver and an example linear solver for implementing techniques relating to pneumatic system modeling and simulation, according to at least one example.
Figure 3:
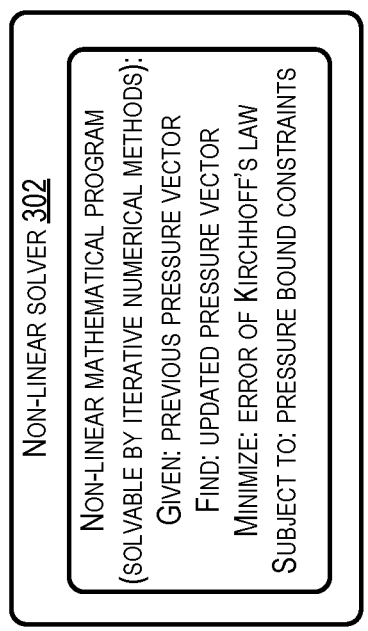

In particular, FIG. 3 illustrates example block diagrams illustrating aspects of a non-linear solver 302 and aspects of a linear solver 304 used to perform modeling, according to at least one example. In some examples, the non-linear solver 302 may rely on nonlinear programming, and may include converting the problem of root-finding into mathematical programming. The non-linear solver 302 may solve for pressures at a state, given the pressures at the previous states. Running the non-linear solver may include using a non-linear mathematical program that is solvable by iterative numerical methods. For example, given a previous pressure vector, the non-linear solver 302 may find an updated pressure vector, while minimizing error of Kirchhoff's Law, subject to pressure bound characteristics.

In some examples, the linear solver 304 may be used to generate the pneumatic model. The linear solver 304 may assume that state changes (e.g., pressure changes) are slow. running the linear solver at the time step at block 724. This may include linearizing at the previous time step that was last successful. The linear solver 304 may be based on the assumption that pressure change in the system is slow. The linear solver 304 may include one or more operations including computing flow function Jacobians and zero-order flow functions at block 306 and solving for the updated pressure by solving a linear system of equations at block 308. This may include leveraging the Taylor Expansion to perform online linearization of the flow function at the point of the previous time step.

Figure 4:
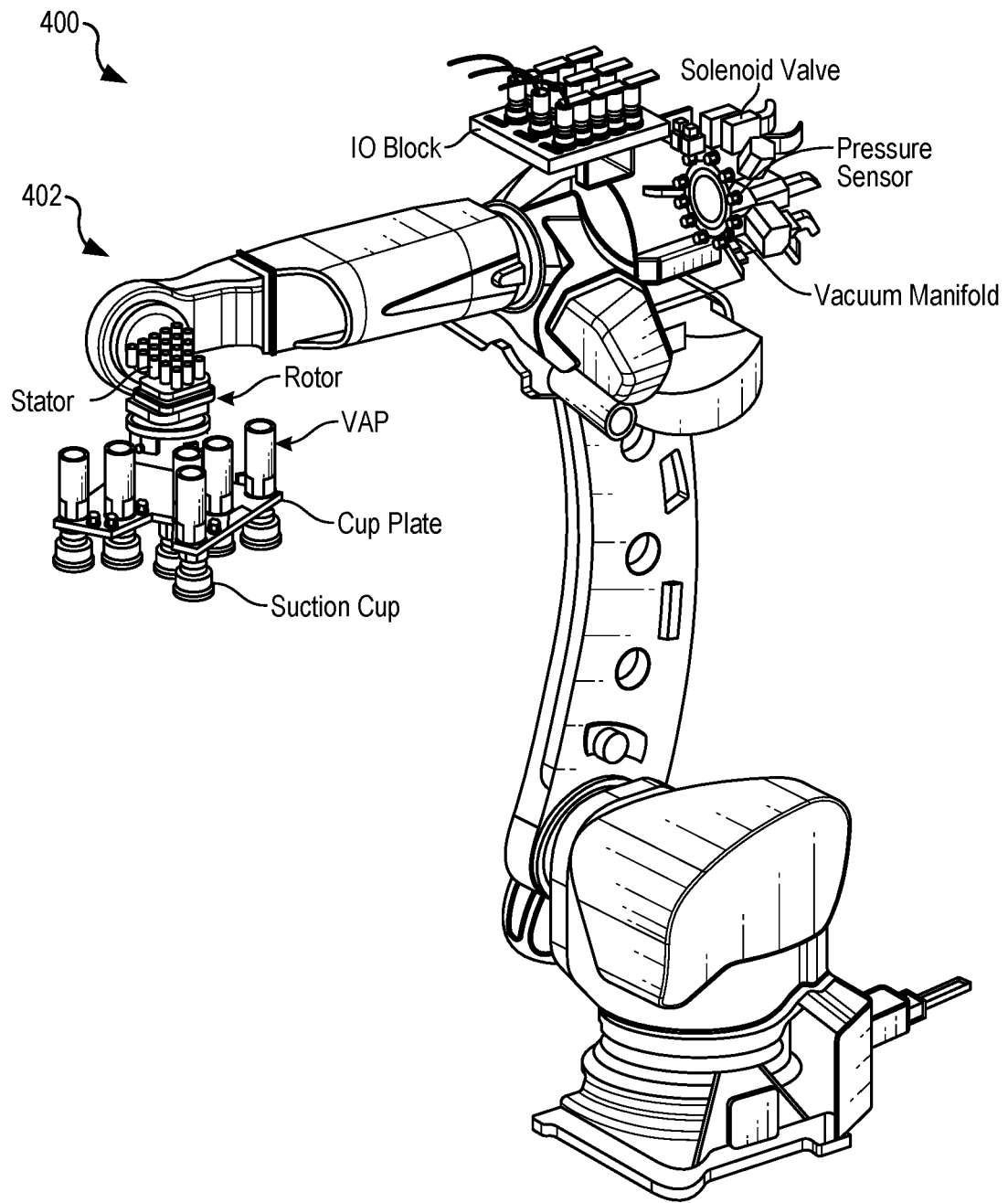
FIG. 4 illustrates an example robotic manipulator including a pneumatic system that may be modeled and controlled using techniques relating to pneumatic system modeling and simulation, according to at least one example.
Figure 5:
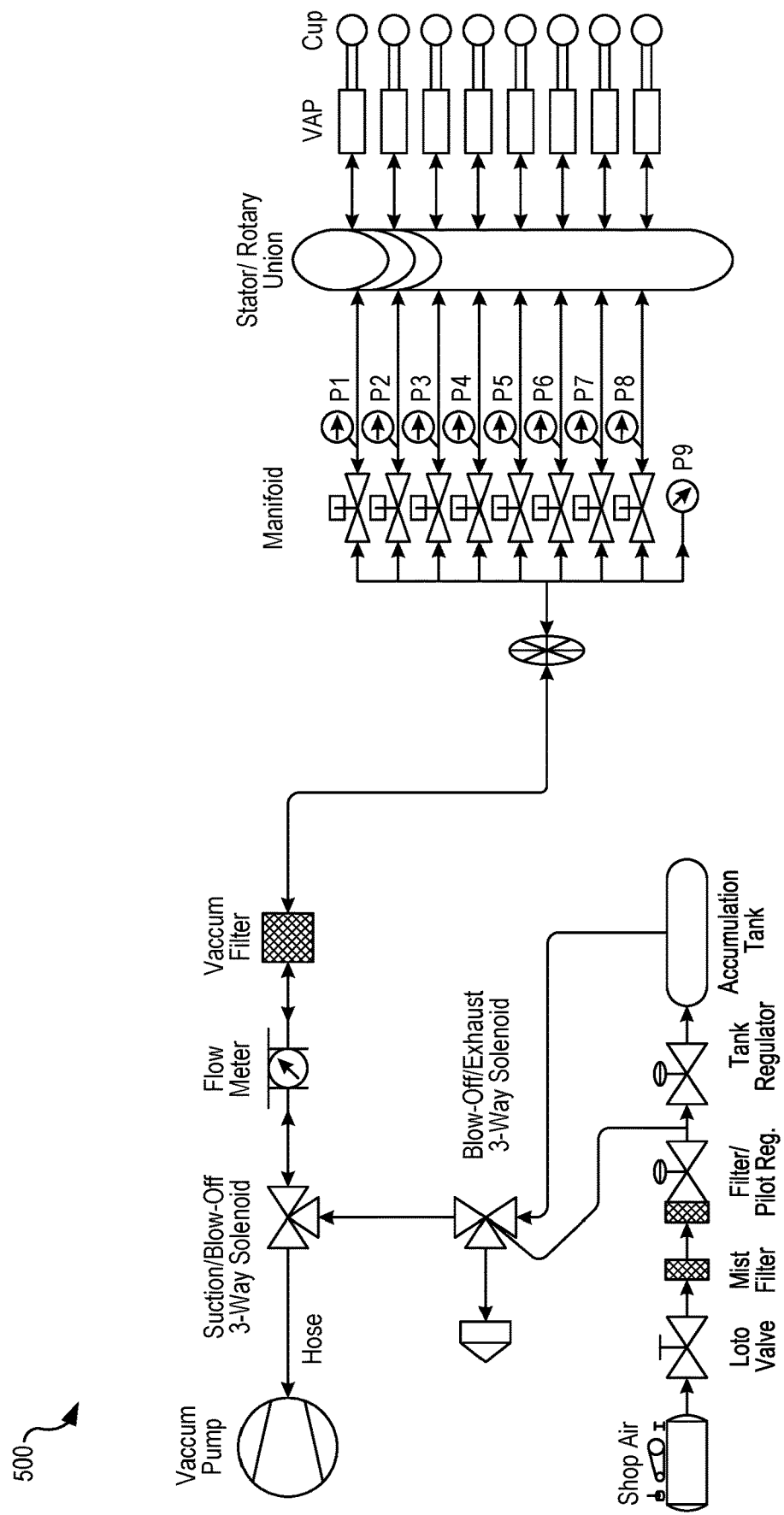
FIG. 5 illustrates a block diagram showing example components of the pneumatic system of FIG. 4, according to at least one example.

FIG. 4 illustrates an example robotic manipulator 400 including a pneumatic system 402 that may be modeled and controlled using techniques relating to pneumatic system modeling and simulation, according to at least one example. FIG. 5 illustrates a block diagram showing example components of the pneumatic system of FIG. 4, according to at least one example.

The robotic manipulator 400 may be any suitable material handling equipment (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles items). The robotic manipulator 400 is configured to pick up and manipulate items (e.g., remove from pallet and place on conveyor belt). In some examples, the robotic manipulator 400 may be configured to pick up items and place the items singularly at a different location.

In some examples, depending on the application for the robotic manipulator 400, different end effectors (e.g., end of arm tools) may be selected. For manipulation of cuboidal items, the robotic manipulator 400 may include an end effector that includes a plurality of suction devices arranged in a grid and capable of selective manipulation. For example, depending on the size of a top surface of a cuboidal item, certain ones of the suction devices may be turned on and others turned off.

Example categories of other types of end effectors include: magnetized end effectors, soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or Ferrofluids (e.g., fluids having suspended Ferro-magnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

At least some pneumatic components of the pneumatic system 402 are illustrated and labeled in FIG. 4. For example, the pneumatic system 402 may include a vacuum manifold, pressure sensor, solenoid valve, stator, rotor, VAPs, cup plate, and suction cups. The pneumatic system 402 may also include other components as described in more detail in FIG. 5. The techniques described herein may be used to simulate particular operations of a robotic manipulator and corresponding pneumatic system, as shown in FIG. 4. In addition, the techniques described herein may be used to design a robotic manipulator and corresponding pneumatic system, as shown in FIG. 4. In some examples, the techniques described herein may be used to control the operation of a robotic manipulator and corresponding pneumatic system, as shown in FIG. 4.

As introduced herein, FIG. 5 illustrates a block diagram 500 showing example components of the pneumatic system 402 of FIG. 4, according to at least one example. Components of the block diagram 500 may be used to generate a pneumatic component graph and a pneumatic element graph, as described herein. Example components included in the block diagram 500 include vacuum pump source and shop air source, hoses, solenoids, flow meters, vacuum filters, valves, mist filters, regulators, accumulation tanks, manifolds, pressure sensors, stator and rotor to form a rotary union, VAPs, suction cups, and other similar pneumatic components.

Figure 6:
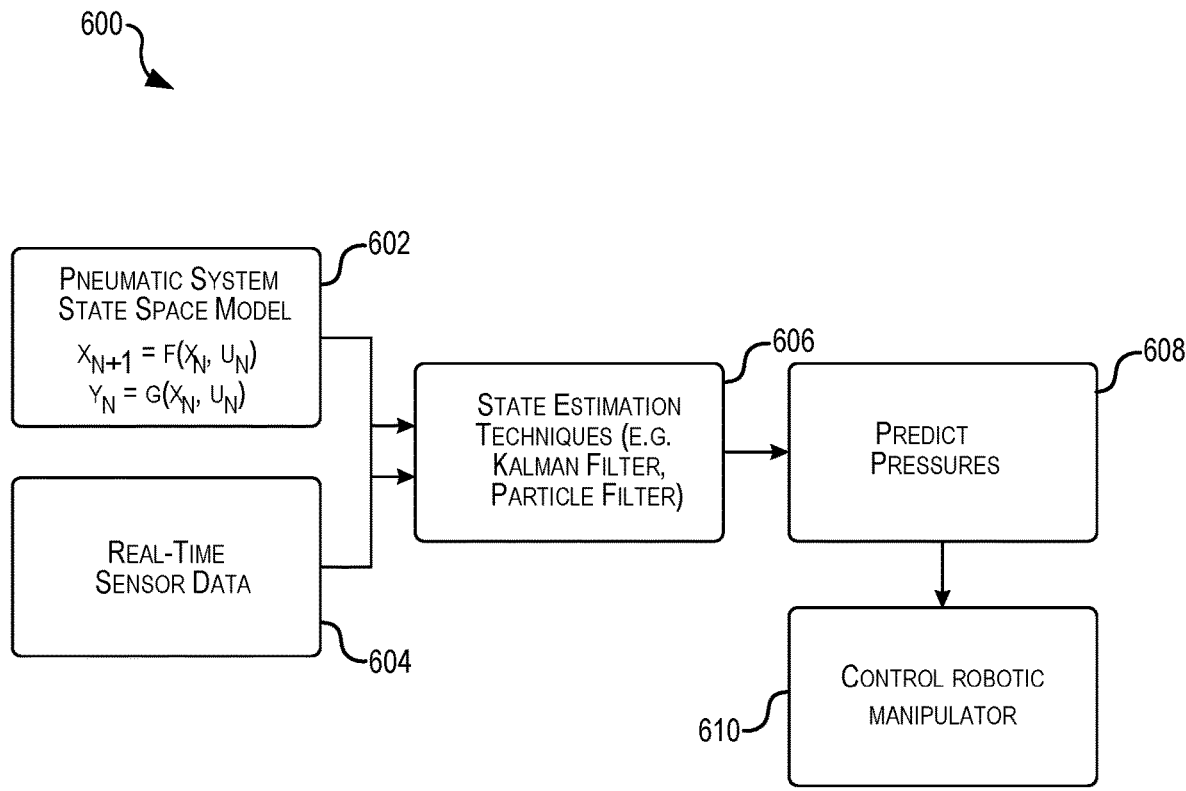
FIG. 6 illustrates a flow diagram showing an example process for implementing techniques relating to pneumatic system modeling and simulation, according to at least one example.
Figure 7:
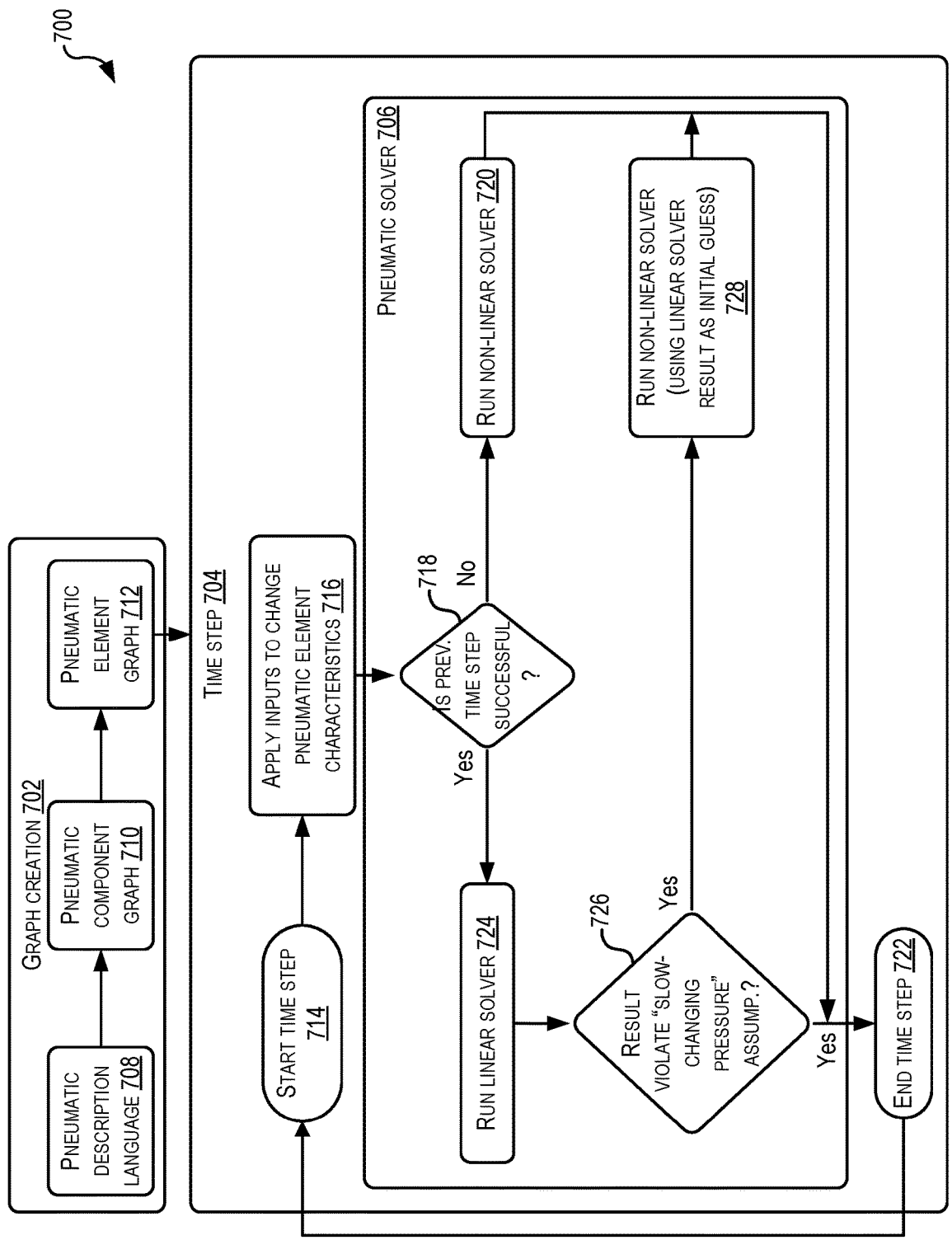
FIG. 7 illustrates a flow diagram showing an example process for implementing techniques relating to pneumatic system modeling and simulation, according to at least one example.
Figure 8:
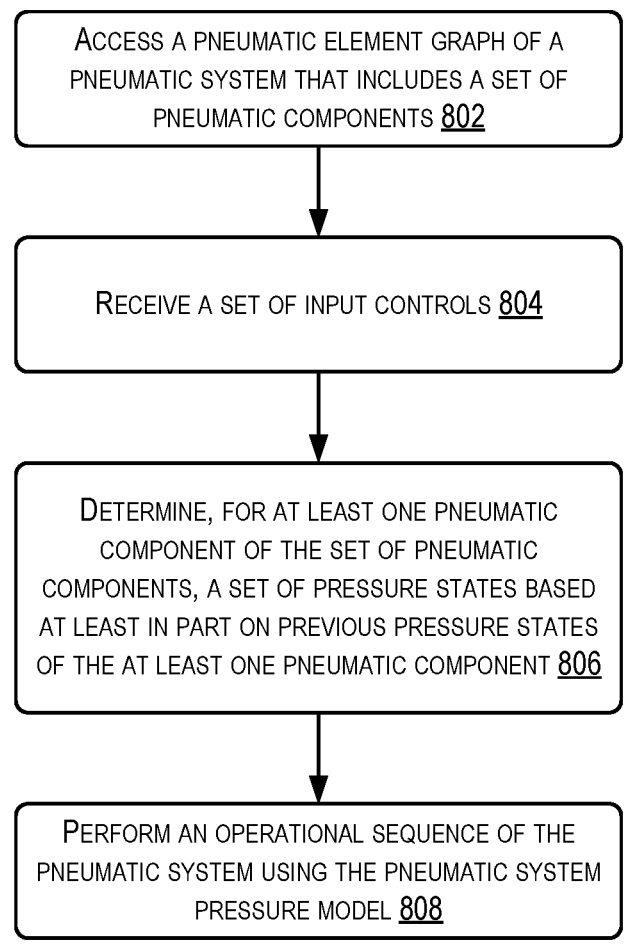
FIG. 8 illustrates a flow diagram showing an example process for implementing techniques relating to pneumatic system modeling and simulation, according to at least one example.

FIGS. 6, 7, and 8 illustrate example flow diagrams showing respective processes 600, 700, and 800 as described herein. These processes 600, 700, and 800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 6 illustrates a flow diagram showing an example process 600 for implementing techniques relating to pneumatic system modeling and simulation, according to at least one example. In particular, the process 600 relates to a model-based process for evaluating grasps of a robotic manipulator based on a pneumatic system of the robotic manipulator. The process 600 combines state-based pneumatic system modeling/simulation, as described herein, with real-time sensor data collected from physical sensors disposed at various locations on the pneumatic system of the robotic manipulator. As sensor placement may not be practical or even possible at all locations in the pneumatic system, the process 600 can function as a corollary for predicting pressures at locations in the system that do not have sensors. For example, in the robotic manipulator 400, it may be impossible or impractical to place sensors at each suction cup of the suction cup end effector because the suction cup end effector is connected via a rotary union and sensor cabling would be cumbersome and could limit movement of the robotic manipulator. The process 600 can be implemented using a computer system such as the computer system 102.

The process 600 begins at block 602 by the computer system 102 accessing a pneumatic system state space model such as one described herein. The state space model may be generated at block 602 and/or accessed from memory of the computer system 102. The state space model may correspond to the pneumatic system and/or otherwise represent it.

At block 604, the process 600 includes the computer system 102 accessing real-time sensor data from one or more sensors of the pneumatic system. For example, this may include one or more pressure sensors disposed at various locations of the pneumatic system.

At block 606, the process 600 includes the computer system 102 using a state estimation technique to evaluate pressure states of the pneumatic system using the state space model and the real-time sensor data. Examples of state estimation techniques may include Kalman filters, Particle filters, and the like.

At block 608, the process 600 includes the computer system 102 predicting pressures. Predicting pressures may include using the output from the state estimation techniques to estimate pressures at various locations throughout the pneumatic system. For example, block 608 may include predicting pressures at suction cups in the end effector of the robotic manipulator. Pressures may be predicted at other locations in the system as well. For example, in hoses, at manifolds, at solenoids, and anywhere else in the system that has been modeled for a pressure estimate.

At block 610, the process 600 includes the computer system 102 controlling the robotic manipulator based on the predicted pressures from block 608. For example, this may include using the predicted pressures to determine the quality of a grip by the suction cups.

FIG. 7 illustrates a flow diagram showing an example process 700 for switching between the linear solver 304 (FIG. 3) and the non-linear solver 302 (FIG. 3) for implementing techniques relating to pneumatic system modeling and simulation, according to at least one example. The process 700 may be implemented to achieve both high accuracy and fast computation. The process 700 may be performed by a computer system such as the computer system 102. The process 700 includes a graph creation portion 702, a time step portion 704, and, within the time step portion 704, a pneumatic solver portion 706.

Beginning with the graph creation portion 702, the process 700 begins at block 708 by the computer system 102 receiving a description of a pneumatic system using a pneumatic description language. A similar operation is described as block 104 in FIG. 1. The pneumatic description may be input by a user and/or generated from a user input. For example, a user may use a pneumatic system builder by which the user builds a virtual system, and block 708 may include the computer system 102 generating the description based on the virtual system. The pneumatic description language may define pneumatic characteristics of each pneumatic component in the system, the topology of the pneumatic system (represented by a pneumatic circuit) encoded by a human-readable upstream and downstream relationships of different components, and other miscellaneous characteristics (e.g., valve switching times, etc.).

At block 710, the process 700 includes the computer system 102 generating a pneumatic component graph, which may be based on the description of block 708. A similar operation is described as block 106 in FIG. 1. The pneumatic component graph may represent the topology of the pneumatic system at the component level (e.g., in terms of pumps, valves, hoses, etc.). At block 712, the process 700 includes the computer system 102 generating a pneumatic element graph, which may be based on the pneumatic component graph of block 710. A similar operation is described as block 106 in FIG. 1. The pneumatic element graph may represent the topology of the pneumatic system at the element level (e.g., in terms of pneumatic source, pneumatic resistances, pneumatic capacitances, pressure locations, etc.).

Turning now to the time step portion 704, the process 700 includes, at block 714, the computer beginning at a first time step. At block 716, the process 700 includes the computer system 102 applying inputs to change pneumatic element characteristics. This may include applying inputs such as solenoid control instructions, cup distances, and other control-like information that changes the operation of the pneumatic system.

The pneumatic solver portion 706, which is nested within the time step portion 704, begins at block 718. At block 718, the process 700 includes determining whether the previous time step was successful (e.g., the time step of block 714). If the answer is no, the process 700 proceeds to block 720. At block 720, the process 700 includes the computer system running the non-linear solver for the time step. Running the non-linear solver may include using a non-linear mathematical program that is solvable by iterative numerical methods. For example, given a previous pressure vector, find an updated pressure vector, while minimizing error of Kirchhoff's Law, subject to pressure bound characteristics.

After running the non-linear solver for the time step, from block 720, the process 700 ends the time step at block 722. If the answer at block 718 is yes, the process 700 includes the computer system 102 running the linear solver at the time step at block 724. This may include linearizing at the previous time step that was last successful. Running the linear solver at block 724 may be based on the assumption that pressure change in the system is slow, and may include computing flow function Jacobians and zero-order flow functions and solving for the updated pressure by solving a linear system of equations. This may include leveraging the Taylor Expansion to perform online linearization of the flow function at the point of the previous time step. In this manner, the updated pressure can be found by solving a linear system of equations with efficient solvers.

At block 726, the process 700 includes the computer system 102 determining whether the result of the linear solver violates an assumption of the linear solver. In particular, the linear solver relies on an assumption that pressures changes are slow between states. If this assumption does not hold true (e.g., the answer at 726 is yes), the process 700 proceeds to block 728. At block 728, the process 700 includes the computer system 102 running the non-linear solver. In some examples, block 728 may be distinct from block 720 in that at block 728 the linear solver result may be used as the first guess. Running the non-linear solver may include using a non-linear mathematical program that is solvable by iterative numerical methods. For example, given a previous pressure vector, find an updated pressure vector, while minimizing error of Kirchhoff's Law, subject to pressure bound characteristics.

If the answer at block 726 is no, the process 700 ends the evaluation of the time step at block 722. The process 700 may be repeated iteratively for each time step. Thus, following block 722, the process returns to block 714.

FIG. 8 illustrates a flow diagram showing an example process 800 for implementing techniques relating to pneumatic system modeling and simulation, according to at least one example. A computer system such as the computer system 102 may perform the process 800. The process 800 begins at block 802 by the computer system 102 accessing a pneumatic element graph of a pneumatic system that includes a set of pneumatic components. The pneumatic element graph may represent pneumatic elements of the set of pneumatic components and relationships between individual pneumatic components of the set of pneumatic components. In some examples, the set of pneumatic components may include one or more of a pump, a vacuum, a hose, a solenoid, or a suction cup. In this example, the pneumatic elements may include one or more of a pneumatic source, a pneumatic resistance, or a pneumatic capacitance.

In some examples, the process 800 may further include, prior to accessing the pneumatic element graph, generating the pneumatic element graph. Generating the pneumatic element graph may include receiving, via a user input, a connection configuration file that identifies characteristics of the set of pneumatic components. Generating the pneumatic element graph may also include generating a pneumatic component graph using the connection configuration file. The pneumatic component graph may include first vertices that correspond to pneumatic components and first edges that correspond to connections between the pneumatic components. Generating the pneumatic element graph may include generating the pneumatic element graph by identifying pneumatic elements associated with each pneumatic component represented in the pneumatic component graph. The pneumatic element graph may include second vertices that correspond to air pressures and second edges that correspond to the pneumatic elements.

At block 804, the process 800 includes the computer system 102 receiving a set of input controls. The set of input controls may correspond to at least one of i) an operational command of at a first pneumatic component of the set of pneumatic components, or ii) a geometric feature of a second pneumatic component of the set of pneumatic components. In some examples, the operational command may include a solenoid command, and the geometric feature may include a suction device distance.

At block 806, the process 800 includes the computer system 102 determining, for at least one pneumatic component of the set of pneumatic components, a set of pressure states based at least in part on previous pressure states of the at least one pneumatic component. The set of pressure states may be represented by a vector.

In some examples, determining the set of pressure states based at least in part on the previous pressure states of the at least one pneumatic component may include using a linear solver to determine the set of pressure states. In some examples, the linear solver may be dependent on the pneumatic element graph and a flow function that represents flow at individual pneumatic components of the set of pneumatic components.

In some examples, determining the set of pressure states based at least in part on the previous pressure states of the at least one pneumatic component may include using a non-linear solver to determine the set of pressure states. In some examples, the non-linear solver may utilize non-linear programming.

In some examples, determining the set of pressure states based at least in part on the previous pressure states of the at least one pneumatic component may include selecting between a linear solver and a non-linear solver based at least in part on whether the linear solver successfully determined an immediately previous pressure state, and using the selected solver to determine the set of pressure states.

At block 808, the process 800 includes the computer system 102 performing an operational sequence of the pneumatic system using the set of pressure states. In some examples, the pneumatic system may be implemented in a robotic manipulation system that includes a robotic arm and an end effector including two or more suction devices. In some examples, the pneumatic system may include a simulated pneumatic system and the robotic manipulation system may include a simulated robotic manipulation system, and performing the operational sequence may include simulating the operational sequence. In some examples, the set of pressure states may include a set of future pressure states. In this example, determining the set of pressure states based at least in part on the previous pressure states of the at least one pneumatic component may include iteratively modeling a next future pressure state using an immediately previous pressure state of the previous pressure state.

The pneumatic system may include changes of pressure values for individual locations of a set of locations within the pneumatic system for a given set of control inputs. The modeling of pressure states may be used to simulate or otherwise predict how pressures (and corresponding operations of end effectors) will operate given certain conditions. In some examples, modeling may be used to control the operation of the pneumatic system, as described herein. This may include providing output from the modeling (e.g., predicted pressure values) as inputs into a control algorithm.

In some examples, the process 800 may further include outputting a visual representation of the set of pressure states as the set of pressure states change while performing the operational sequence.

Figure 9:
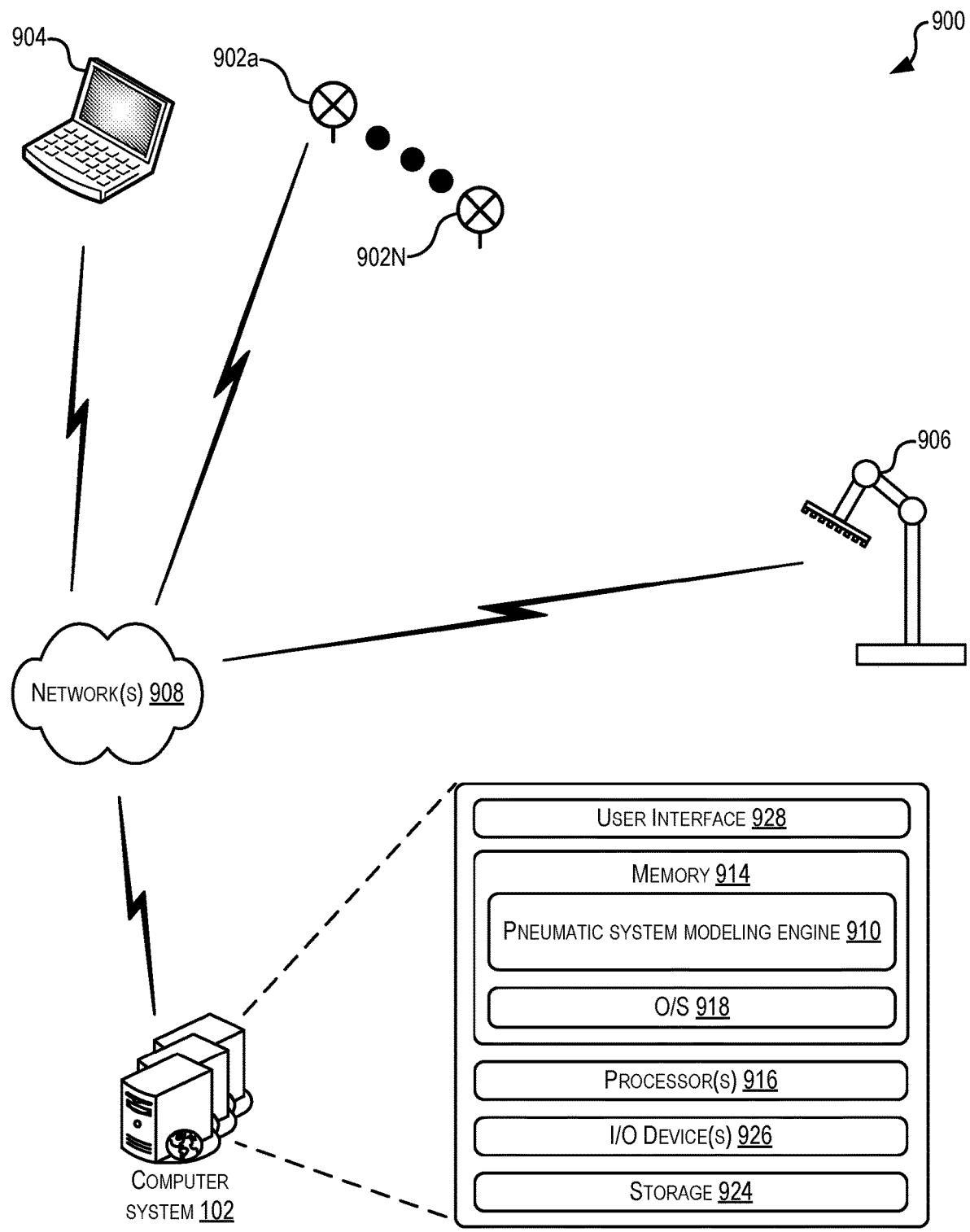
FIG. 9 illustrates a system or architecture for implementing techniques relating to pneumatic system modeling and simulation, according to at least one example.

FIG. 9 illustrates a system or architecture 900 for implementing techniques relating to pneumatic system modeling and simulation, according to at least one example. The system 900 includes the computer system 102 in communication with a user device 904, a robotic manipulator 906, and one or more sensors 902a-902N via one or more networks 908 (hereinafter, "the network 908") and/or one or more wired connections. The network 908 may include any one or a combination of many different types of networks, such as radio networks, cable networks, the Internet, wireless networks, cellular networks, and other private, and/or public networks.

The computer system 102 may include one or more server computers, perhaps arranged in a cluster of servers or as a server farm. These servers may be configured to perform computing operations as described herein. In some examples, the servers (and the components thereof) may be distributed throughout more than one location. The servers may also be virtual computing resources. The computer system 102 may be implemented as part of a robotic system development system, testing system, and the like.

The computer system 102 may include at least one memory 914 and one or more processing units (or processor(s)) 916. The processor 916 may be implemented as appropriate in hardware, computer-executable instructions, software, firmware, or combinations thereof. Computer-executable instruction, software, or firmware implementations of the processor 916 may include computer-executable or machine-executable instructions written in any suitable programming language to perform the various functions described. The memory 914 may include more than one memory and may be distributed throughout the computer system 102. The memory 914 may store program instructions that are loadable and executable on the processor(s) 916, as well as data generated during the execution of these programs. Depending on the configuration and type of memory including the computer system 102, the memory 914 may be volatile (such as random access memory (RAM)) and/or non-volatile (such as read-only memory (ROM), flash memory, or other memory). The memory 914 may include an operating system 918 and one or more application programs, modules, or services for implementing the features disclosed herein including at least a pneumata system modeling engine 910.

The computer system 102 may also include additional storage 924, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 924, both removable and non-removable, are examples of computer-readable storage media, which may be non-transitory. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the computer system 102.

The computer system 102 may also include input/output (I/O) device(s) and/or ports 926, such as for enabling connection with a keyboard, a mouse, a pen, a voice input device, a touch input device, a display, speakers, a printer, or other I/O device.

The computer system 102 may also include a user interface 928. The user interface 928 may be utilized by an operator or other authorized user to access portions of the computer system 102. In some examples, the user interface 928 may include a graphical user interface, web-based applications, programmatic interfaces such as application programming interfaces (APIs), or other user interface configurations. In some examples, the user interface 928 is presented at one of the user device 904.

The user device 904 may be any suitable type of computing device such as, but not limited to, a tablet, a mobile phone, a smart phone, a personal digital assistant (PDA), a laptop computer, a desktop computer, a thin-client device, a tablet computer, or any other suitable device capable of communicating with the computer system 102, the robotic manipulator 906, and/or other elements of the system 900 via the network 908 in accordance with techniques described herein. In some examples, the user device 904 may access the computer system 102 to perform the techniques described herein and/or may be configured to perform the operations described herein without communicating with the computer system 102.

The one or more sensors 902 may include one or more pressure sensors disposed throughout the system. In some examples, the one or more sensors 902 are used to provided pressure signals from the robotic system, which can be compared to a simulated/modeled system and/or to provide control signals to the robotic system.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   accessing a pneumatic component graph of a pneumatic system that comprises first vertices corresponding to a set of pneumatic components of the pneumatic system and first edges corresponding to connections between the set of pneumatic components of the pneumatic system;
   generating a pneumatic element graph of the pneumatic system based at least in part on the pneumatic component graph, the pneumatic element graph comprising second vertices corresponding to air pressures of interest and second edges corresponding to pneumatic elements, the pneumatic element graph comprising the set of pneumatic components comprising a pneumatic end effector comprising a plurality of suction devices, the pneumatic element graph representing pneumatic elements of the set of pneumatic components and relationships between individual pneumatic components of the set of pneumatic components, the pneumatic system being associated with a robotic manipulation system that includes the pneumatic end effector;
   receiving, via a user input, a set of input controls that correspond to i) an operational command of at a first pneumatic component of the set of pneumatic components, and ii) a geometric feature of a second pneumatic component of the set of pneumatic components, wherein the second pneumatic component comprises a suction device and the geometric feature comprises a distance between the suction device and an object to be manipulated;
   determining iteratively, for the set of pneumatic components, individual sets of updated pressure states based at least in part on respective previous pressure states of individual pneumatic components of the set of pneumatic components; and
   performing an operational sequence of the robotic manipulation system using the individual sets of updated pressure states.

2. The computer-implemented method of claim 1, wherein the pneumatic system comprises a simulated pneumatic system and the robotic manipulation system comprises a simulated robotic manipulation system, and wherein performing the operational sequence comprises simulating the operational sequence.

3. The computer-implemented method of claim 1, wherein determining iteratively the individual sets of updated pressure states comprises using a linear solver to determine the individual sets of updated pressure states.

4. The computer-implemented method of claim 3, wherein the linear solver is dependent on the pneumatic element graph and a flow function that represents flow at the individual pneumatic components.

5. A computer-implemented method, comprising:
   accessing a pneumatic component graph of a pneumatic system that comprises first vertices that correspond to pneumatic components and first edges that correspond to connections between the pneumatic components of the pneumatic system;
   generating a pneumatic element graph of the pneumatic system based at least in part on the pneumatic component graph, the pneumatic element graph comprising second vertices corresponding to air pressures and second edges corresponding to pneumatic elements, the pneumatic element graph comprising a set of pneumatic components comprising a pneumatic end effector comprising a plurality of suction devices, the pneumatic element graph representing pneumatic elements of the set of pneumatic components and relationships between individual pneumatic components of the set of pneumatic components, the pneumatic system being associated with a robotic manipulation system that includes the pneumatic end effector;
   receiving a set of input controls that correspond to at least one of i) an operational command of at a first pneumatic component of the set of pneumatic components, or ii) a geometric feature of a second pneumatic component of the set of pneumatic components, wherein the second pneumatic component comprises a suction device and the geometric feature comprises a distance between the suction device and an object to be manipulated;
   determining, for at least one pneumatic component of the set of pneumatic components, a set of pressure states based at least in part on previous pressure states of the at least one pneumatic component; and
   performing an operational sequence of the pneumatic system using the set of pressure states.

6. The computer-implemented method of claim 5, wherein generating the pneumatic element graph by at least:
   receiving, via a user input, a connection configuration file that identifies characteristics of the set of pneumatic components;
   generating the pneumatic component graph using the connection configuration file; and generating the pneumatic element graph by identifying pneumatic elements associated with each pneumatic component represented in the pneumatic component graph.

7. The computer-implemented method of claim 5, wherein the set of pneumatic components comprises one or more of a pump, a vacuum, a hose, a solenoid, or a suction cup, and wherein the pneumatic elements comprise one or more of a pneumatic source, a pneumatic resistance, or a pneumatic capacitance.

8. The computer-implemented method of claim 5, wherein determining the set of pressure states based at least in part on the previous pressure states of the at least one pneumatic component comprises using a linear solver to determine the set of pressure states.

9. The computer-implemented method of claim 8, wherein the linear solver is dependent on the pneumatic element graph and a flow function that represents flow at individual pneumatic components of the set of pneumatic components.

10. The computer-implemented method of claim 5, wherein determining the set of pressure states based at least in part on the previous pressure states of the at least one pneumatic component comprises using a non-linear solver to determine the set of pressure states.

11. The computer-implemented method of claim 5, wherein the set of pressure states comprises a set of future pressure states, and wherein determining the set of pressure states based at least in part on the previous pressure states of the at least one pneumatic component comprises iteratively modeling a next future pressure state using an immediately previous pressure state of the previous pressure states.

12. The computer-implemented method of claim 5, wherein determining the set of pressure states based at least in part on the previous pressure states of the at least one pneumatic component comprises:
    using a linear solver to determine the set of pressure states; and
    performing one of:
        using the linear solver to determine a next set of pressure states when the set of pressure states was successfully determined using the linear solver; or
        using a non-linear solver to determine the next set of pressure states when the set of pressure states was unsuccessfully determined using the linear solver.

13. The computer-implemented method of claim 5, wherein the operational command comprises a solenoid command.

14. The computer-implemented method of claim 5, further comprising outputting a visual representation of the set of pressure states as the set of pressure states change while performing the operational sequence.

15. The computer-implemented method of claim 5, further comprising receiving real-time sensor data corresponding to the pneumatic system, and wherein determining the set of pressure states comprises determining the set of pressure states based at least in part on the real-time sensor data.

16. The computer-implemented method of claim 5, wherein each suction device of the plurality of suction devices is represented by at least one pneumatic component of the set of pneumatic components.

17. A system, comprising:
    one or more memories configured to store computer-executable instructions; and
    one or more processors configured to access the one or more memories and cause the system to at least:
        access a pneumatic component graph of a pneumatic system that comprises first vertices that correspond to pneumatic components and first edges that correspond to connections between the pneumatic components of the pneumatic system;
        generate a pneumatic element graph of the pneumatic system based at least in part on the pneumatic component graph, the pneumatic element graph comprising second vertices corresponding to air pressures and second edges corresponding to pneumatic elements, the pneumatic element graph comprising a set of pneumatic components comprising a pneumatic end effector comprising a plurality of suction devices, the pneumatic element graph representing pneumatic elements of the set of pneumatic components and relationships between individual pneumatic components of the set of pneumatic components, the pneumatic system being associated with a robotic manipulation system that includes the pneumatic end effector;
        receive a set of input controls that correspond to at least one of i) an operational command of at a first pneumatic component of the set of pneumatic components, or ii) a geometric feature of a second pneumatic component of the set of pneumatic components, wherein the second pneumatic component comprises a suction device and the geometric feature comprises a distance between the suction device and an object to be manipulated;
        determine, for at least one pneumatic components of the set of pneumatic components, a set of pressure states based at least in part on previous pressure states of the at least one pneumatic component; and
        perform an operational sequence of the pneumatic system using the set of pressure states.

18. The system of claim 17, wherein generating the pneumatic element graph is based at least in part on one or more user inputs.

19. The system of claim 17, wherein the robotic manipulation system is operational, and wherein performing the operational sequence of the pneumatic system comprises operating the pneumatic end effector of the operational robotic manipulation system using the set of pressure states.

20. The system of claim 17, wherein the robotic manipulation system is simulated, and wherein performing the operational sequence of the pneumatic system comprises simulating an operation of the pneumatic end effector of the simulated robotic manipulation system using the set of pressures states.

* * * * *